(12) United States Patent
Heise et al.

(10) Patent No.: US 9,063,341 B2
(45) Date of Patent: Jun. 23, 2015

(54) EXCHANGEABLE ALIGNMENT MARKER UNIT

(75) Inventors: Heino Heise, Adelebsen (DE); Ulrich Kohlhaas, Goettingen (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 265 days.

(21) Appl. No.: 13/593,038

(22) Filed: Aug. 23, 2012

(65) Prior Publication Data

US 2013/0077160 A1 Mar. 28, 2013

(30) Foreign Application Priority Data

Aug. 24, 2011 (DE) .......................... 10 2011 111 546

(51) Int. Cl.
| | | |
|---|---|---|
| G02B 21/34 | (2006.01) | |
| G01B 3/00 | (2006.01) | |
| G02B 27/32 | (2006.01) | |

(52) U.S. Cl.
CPC ........ G02B 21/34 (2013.01); G01B 3/00 (2013.01); G02B 27/32 (2013.01)

(58) Field of Classification Search
USPC ................................ 359/368–396; 348/79–80
See application file for complete search history.

(56) References Cited

U.S. PATENT DOCUMENTS

| | | |
|---|---|---|
| 5,694,212 A | 12/1997 | Weissman |
| 7,848,019 B2 | 12/2010 | Jennings |
| 2008/0137047 A1 | 6/2008 | Mizutani et al. |
| 2011/0043618 A1 | 2/2011 | Salisbury et al. |
| 2012/0133757 A1* | 5/2012 | Thomas et al. ................. 348/80 |

FOREIGN PATENT DOCUMENTS

| | | |
|---|---|---|
| DE | 10 2009 020 663 A1 | 11/2010 |
| DE | 10 2010 052 674 A1 | 5/2012 |
| JP | 2007-328038 A | 12/2007 |
| WO | WO 2010130639 A1 * | 11/2010 |

* cited by examiner

*Primary Examiner* — Scott J Sugarman
*Assistant Examiner* — Robert E Tallman
(74) *Attorney, Agent, or Firm* — Patterson Thuente Pedersen, P.A.

(57) ABSTRACT

An alignment marker unit for an object holder for microscopic imaging of an object with a microscope, wherein the alignment marker unit can be removed from and remounted on the object holder, wherein the alignment marker unit has at least one alignment marker for microscope-supported detection, and wherein the alignment marker is designed to determine a coordinate system for the object holder which allows for the microscope-supported calibration of the object or an area of the object relative to its position to the object holder and the position of the object holder relative to the microscope. Furthermore, an object holder system including an object holder and an alignment marker unit as described above is provided.

16 Claims, 7 Drawing Sheets

EXCHANGEABLE ALIGNMENT MARKER UNIT

FIELD OF THE INVENTION

The present invention relates to the microscopic imaging of a sample and/or an object.

BACKGROUND

From the applicant's DE102009020663A1, an object holder is known having one or more alignment marks for determining in a simple fashion the position of the object holder relative to the microscope used and the position of object areas of interest relative to the object holder. An object holder with such a design can be used particularly for sequentially acquiring images of an object that remains on the same holder with various microscope modalities, for example, with a series of light microscopy and electron microscopy. The alignment mark of the object holder according to DE102009020663A1 is arranged as a stationary structure on the holder. This has several disadvantages. For example, the structures attached in such a way accumulate dirt easily. It has turned out that such necessarily fine structures are difficult to clean even in an ultrasonic bath. Furthermore, the use of the object holder bears the significant risk of accidentally damaging the sensitive marker structure, which, according to the prior art, renders the entire object holder useless.

SUMMARY OF THE INVENTION

Therefore, the invention addresses the problem of providing an object holder that overcomes the described disadvantages.

According to the invention, this problem is solved through an alignment marker unit for an object holder for microscopic imaging of an object with a microscope which can be remounted on the object holder with the correct distance and azimuth and which has an alignment marker for microscope-supported detection, wherein the latter is designed to determine the position and/or orientation of the object or an area of the object relative to the object holder.

The term microscope is to be understood comprehensively in the present description. Therefore, the term comprises any microscope, i.e., optical microscopes as well as particle beam microscopes. Optical microscopes are microscopes that use electromagnetic radiation, particularly in the visible range, which follows the laws of optics, for image acquisition. Particle beam microscopes are microscopes that use a beam of charged particles, e.g., an electron beam, for image acquisition. The invention is thus applicable for use with optical microscopes as well as with electron microscopes and related applications.

Since the alignment marker unit, according to the invention, is not permanently firmly connected to the object holder but designed as a separate removable and remountable assembly, an object holder can be reused even when its alignment marker has become useless due to dirt accumulation or damage, i.e., when the alignment marker no longer allows for a calibration of the object relative to the position of the holder. In such event, the unusable alignment marker unit, which holds the alignment marker, can simply be replaced with a new unit.

Further advantages, according to the invention, can be achieved when material is removed from an object which is clamped continuously to the object stage and the success of the material removal is then to be examined micro-optically. In such event, the sensitive alignment marker unit can be removed before the material removal treatment and remounted after the treatment. The treatment and evaluation step can be alternately repeated any number of times.

Moreover, the separation of object holder and alignment marker unit results in maximum flexibility. For example, it is conceivable according to the invention, that the alignment marker unit is designed and universally connectable to different object holders adjusted specifically for the corresponding purpose.

Preferably, the alignment marker unit has contact surfaces that are designed for a precise fit with the corresponding contact surfaces of the object holder. In particular, the contact surfaces are designed with a clearance fit of less than 50 µm according to an example embodiment, preferably less than 10 µm according to another example embodiment, particularly preferred less than 5 µm according to a further example embodiment.

The alignment marker unit can advantageously be designed to allow a remounting on the object holder with correct azimuth. In this context, correct azimuth means that the lateral alignment of the surface of the alignment marker unit facing the microscope is determined when the alignment marker unit is remounted on the object holder. This can be accomplished in a variety of ways, with providing a lock-and-key principle on the alignment marker unit and the object holder, which determines the mounting direction being the simplest. The use of a principle that allows for only one single mounting direction of the alignment marker unit on the object holder is preferred.

According to a preferred embodiment, the alignment marker unit can have a two-piece design with at least one contact element and a headpiece. In such a design, the alignment marker is contained in the headpiece.

In an alignment marker unit with contact element and headpiece, the outer surface of the contact element, e.g., in the form of a carrier axle, can have at least two differently designed partial surfaces. This allows for the remounting of the alignment marker unit with correct azimuth on a correspondingly designed object holder. With a contact element in the form of a carrier axle, e.g., a partial surface as cross-section can describe a circle sector with the endpoints A, B, while the other partial surface as cross-section describes, e.g., a straight-line segment at one of the endpoints. In this example, the object holder is designed with a receiving element, i.e., a blind-end or continuous hole with a partial surface, which is tapered longitudinally. The contact element of the alignment marker unit can be introduced in the opening provided on the object holder and, e.g., secured on the object holder using a clamp connection. This fastening version has the advantage that the alignment marker unit can be mounted on the object holder infinitely height adjustable and thus be height-adjustable with regard to the object to be examined. Therefore, it is not necessary to refocus between alignment marker and object, which is particularly elaborate with thicker objects because they lie in a completely different focal plane than an alignment mark, which is rigidly mounted on an object holder according to the prior art.

The carrier axle of such an alignment marker unit can be lengthened using an additional carrier axle element, wherein an even greater variability regarding height adjustability is achieved.

In its operational state, i.e., the state of the alignment marker unit mounted on the object holder, the alignment marker can be captured by the microscope when the object holder is introduced into the microscope. The alignment marker is preferably designed such that is can be detected with a light microscope and a particle beam microscope, e.g., an electron beam microscope. The alignment marker can be applied to the segment, e.g., affixed or printed, carved out of material of the segment, e.g., hot-stamped, or carved into the material, e.g., laser-written or etched.

According to an example embodiment, at least one alignment marker can be L-shaped. The L-shaped design of the alignment marker allows for the precise determination of the coordinate system and thus the calibration of the object or an area of the object relative to its position to the holder and the position of the object holder relative to the microscope.

The alignment marker can be designed as a double structure, wherein the units of the double structure are adjusted to two different microscopy zoom levels.

Preferably, the alignment marker unit can have a plurality of alignment markers, particularly three alignment markers, preferably in different segments that are facing and captured by the microscope.

Preferably, the elements of the alignment marker unit are electrically conducting and connected with one another in an electrically conducting manner. As a result, the alignment marker unit can also be used for microscopy methods using a beam of charged particles for acquiring an image, e.g., electron beam microscopy.

The problem addressed by the invention is further solved with an object holder system for microscopic imaging of an object that has a two-piece design with one object holder and at least one distance- and azimuth-correct remountable alignment marker unit with the above-mentioned features.

For example, the alignment marker unit can be remounted on the object holder with clamping or clamp connection or screw connection. All other types of connections are also encompassed by the invention.

Preferably, the contact surfaces of object holder and alignment marker unit of the object holder system according to the invention are designed with a clearance fit of less than 50 μm according to an example embodiment, preferably less than 10 μm according to another example embodiment, particularly preferred less than 5 μm according to a further example embodiment.

It is furthermore an option that the object holder and alignment marker unit of the object holder system according to the invention are height adjustable to one another.

The object holder system may have a plurality of alignment marker units, particularly three alignment marker units that are independently remountable at the correct distance and azimuth.

In a further example embodiment, object holder and alignment marker unit of the object holder system are connected with one another in an electrically conducting manner when remounted.

BRIEF DESCRIPTION OF THE DRAWINGS

In the following, the invention is further described using embodiments with references to the attached drawings.

DETAILED DESCRIPTION

In the following, embodiments of the present invention are further described. It must be noted that features of different embodiments can be combined with one another unless stated otherwise. However, a description of an embodiment with a plurality of features is not to be interpreted such that all these features are necessary for the realization of the invention because other embodiments can have fewer features and/or alternative features.

Figure 1:
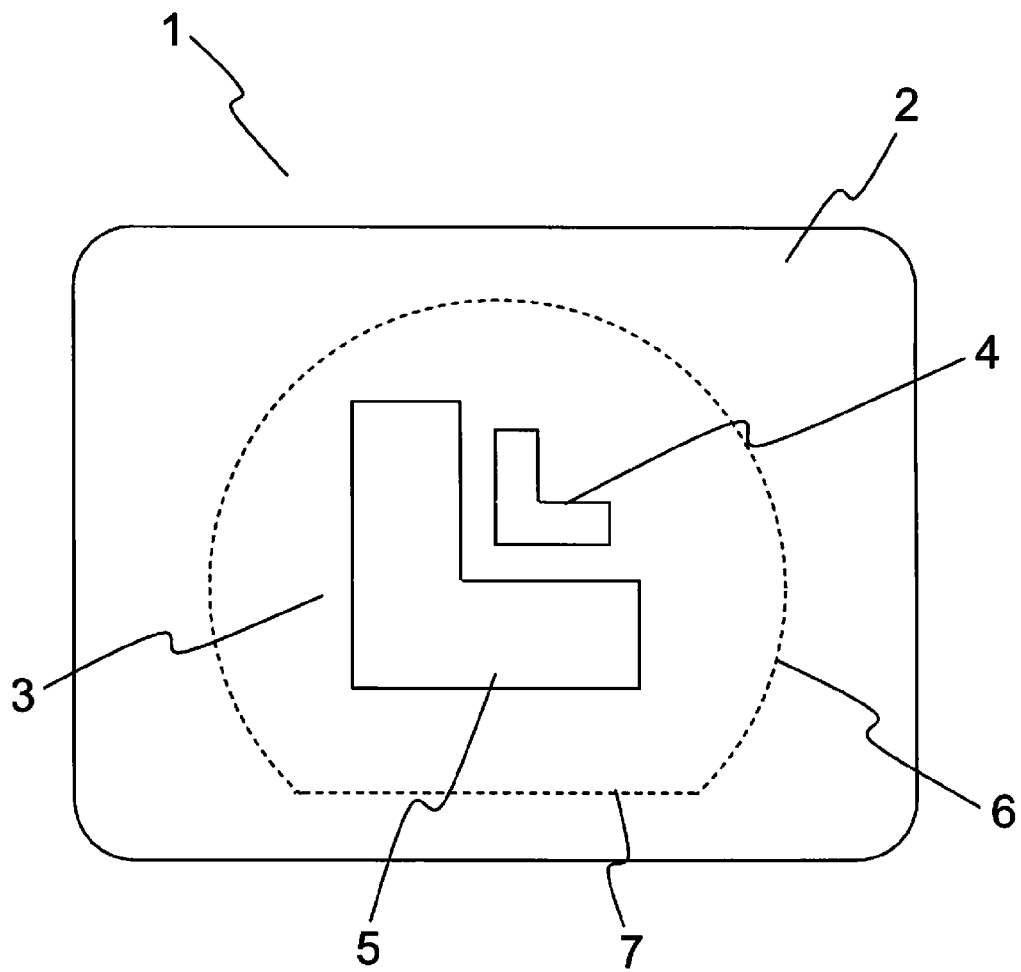
FIG. 1 depicts the top view of a first embodiment of the alignment marker unit according to the invention.
Figure 2:
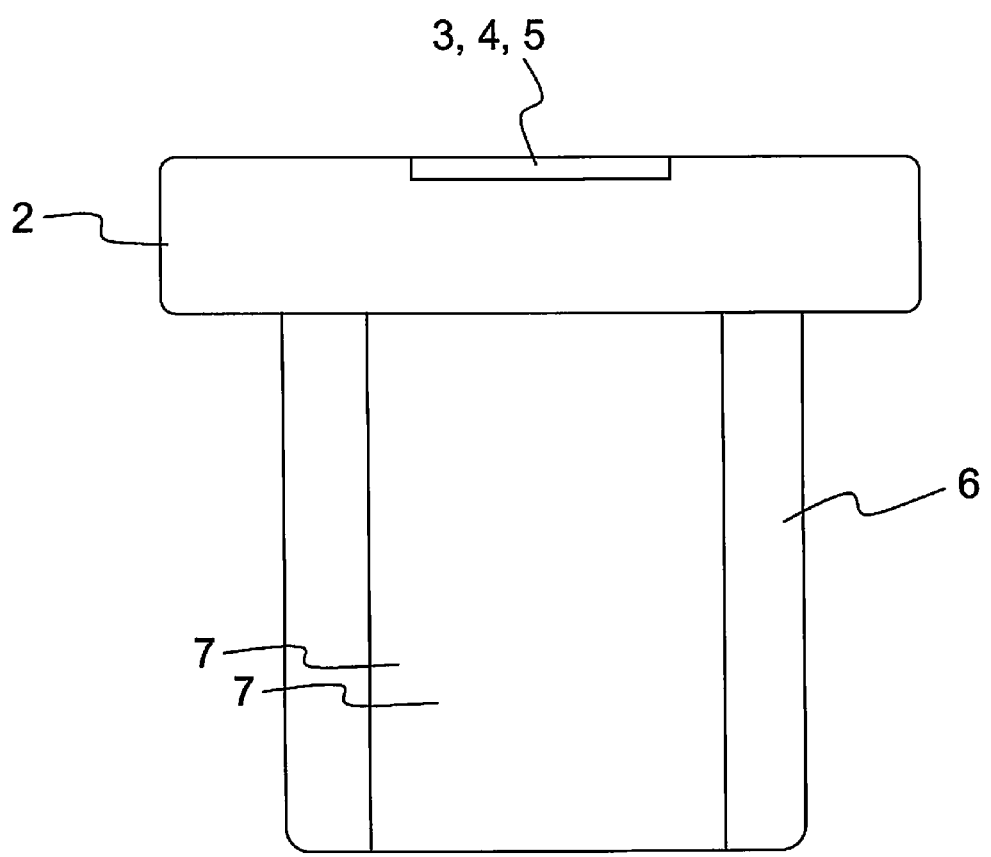
FIG. 2 depicts the side view of the embodiment of the alignment marker unit in FIG. 1.

In a first embodiment of the alignment marker unit 1 according to FIGS. 1 and 2, the alignment marker unit is made of an electrically conducting material in a T-shape. FIG. 1 depicts the upper side of the headpiece 2 which can be captured by the microscope in its operational state, i.e., the state of the alignment marker unit mounted on the object holder, when the object holder is inserted in the microscope. The upper side of the headpiece 2 has a central alignment marker 3. The alignment marker is laser-engraved in the material of the alignment marker unit. The alignment marker is designed as double marking 4, 5 which is adjusted to different microscopy zoom levels. This ensures an easier identification of the alignment marker. Similar to the smaller partial marker 5, the larger partial marker 4 is designed as an L-shaped structure for microscope-supported detection. Due to the L-shaped design, the marker orientation is clearly identified. This also determines a coordinate system for the object holder, which allows for the microscope-supported calibration of the object or an area of the object relative to its position to the object holder and the position of the object holder relative to the microscope.

FIG. 2 depicts a side view the T-shaped design of the alignment marker unit comprising a headpiece 2 and a contact element in the form of a carrier axle 6. The cross-section of the carrier axle 6 is substantially circular but has a partial surface 7, which is tapered longitudinally. This ensures a precise and azimuth-correct remounting of the alignment marker unit relative to the object holder when the alignment marker unit is introduced into an opening of an object holder correspondingly designed as mirror image.

Figure 3:
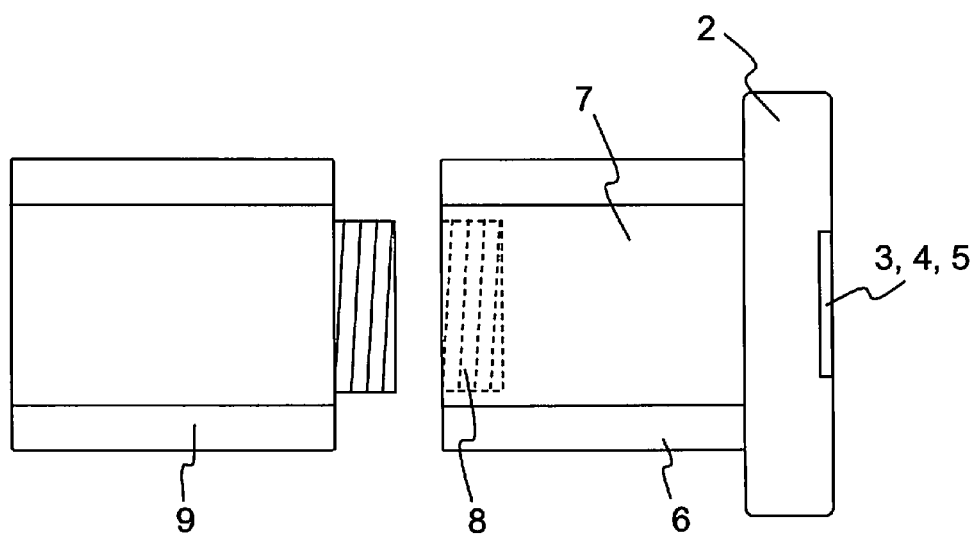
FIG. 3 depicts a second embodiment of the alignment marker unit according to the invention.

FIG. 3 depicts a second embodiment of the alignment marker unit according to the invention. The alignment marker unit of FIGS. 1 and 2 has been additionally provided with a female thread 8 for an extension part 9 of the carrier axle to be screwed on in order to allow for an even better height adjustment of the alignment marker to the object to be examined.

Figure 4:
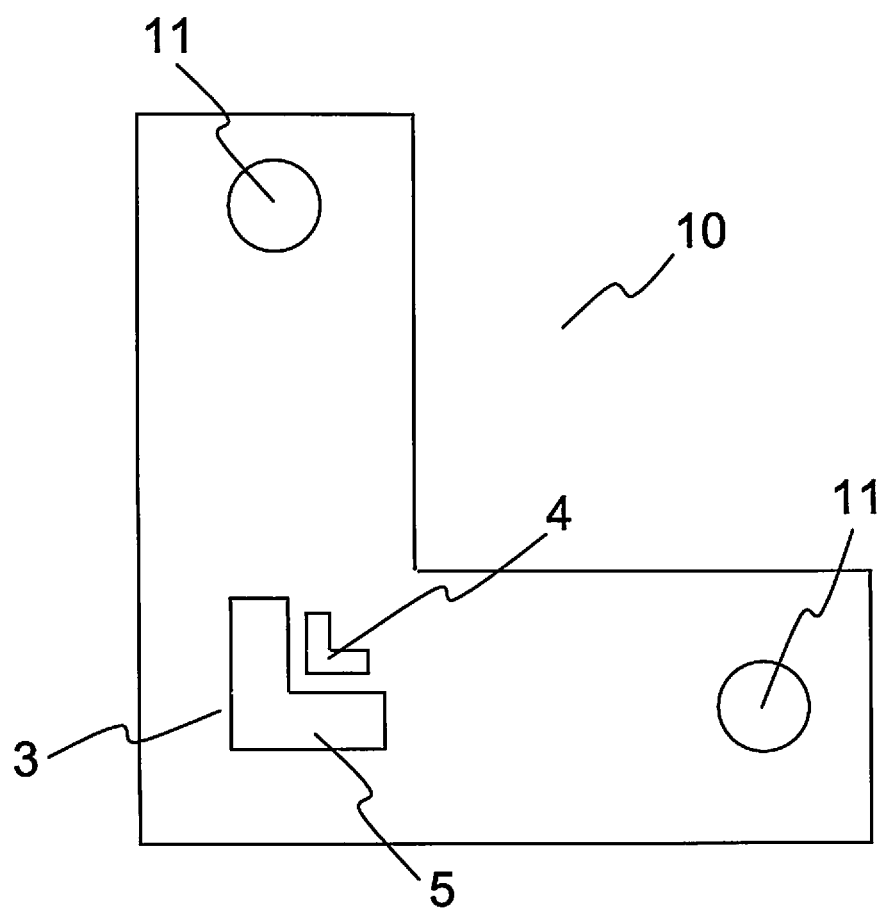
FIG. 4 depicts the top view of a third embodiment of the alignment marker unit according to the invention.

FIG. 4 depicts a further embodiment of the alignment marker unit according to an embodiment of the invention. The alignment marker unit 10 has an L-shaped outline and can, e.g., be inserted precisely fitting and azimuth-correctly in a correspondingly designed recess of an object holder. The alignment marker unit 10 has two bores 11 with which the unit can be mounted to the object holder using, e.g., a screw connection. At the crossing point of the two stems of the L, an alignment marker 3 is attached which, in turn, is designed as double structure 4, 5 and is laser-engraved in the material of the alignment marker unit.

Figure 5:
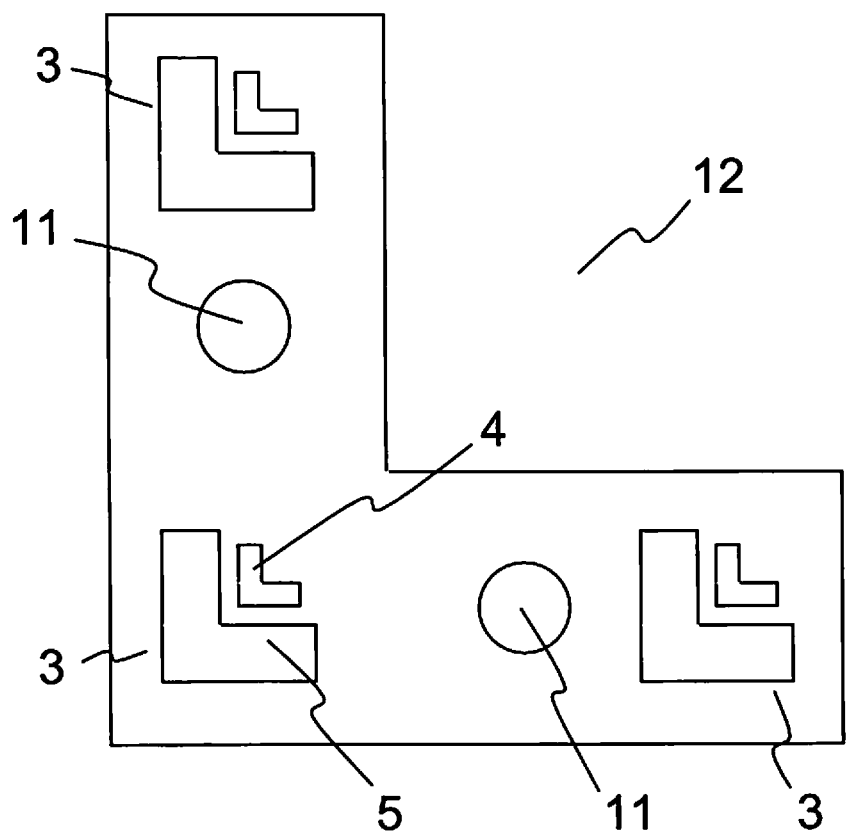
FIG. 5 depicts the top view of a fourth embodiment of the alignment marker unit according to the invention.

FIG. 5 depicts an alignment marker unit 12 expanded by some aspects from the embodiment depicted in FIG. 4. The alignment marker unit of FIG. 5 has three alignment markers 3, which are spaced apart from one another such that they define a coordinate system which, in its operational state, i.e., the state of the alignment marker unit mounted on the object holder, allows for the microscope-supported calibration of the object or an area of the object relative to its position to the object holder and the position of the object holder relative to the microscope. The three alignment markers are approached consecutively and the corresponding position of a sliding stage of the microscope is read. This can be done manually by the user or automatically using image processing algorithms. Once the coordinates of the three alignment markers are thus determined, the coordinate system of the object holder is defined. As a result, the position of the sample stage can easily be saved for every object area of interest. After the transfer of the object holder to a further microscope, the positions of the alignment markers 3 are once again calibrated. Then the previously saved positions of the object areas of interest can be read by the control unit of the further microscope and once again approached without a time-consuming search. Compared to the embodiment in FIG. 4, the bores 11 for the remountable fastening to the object holder are moved inward.

Figure 6:
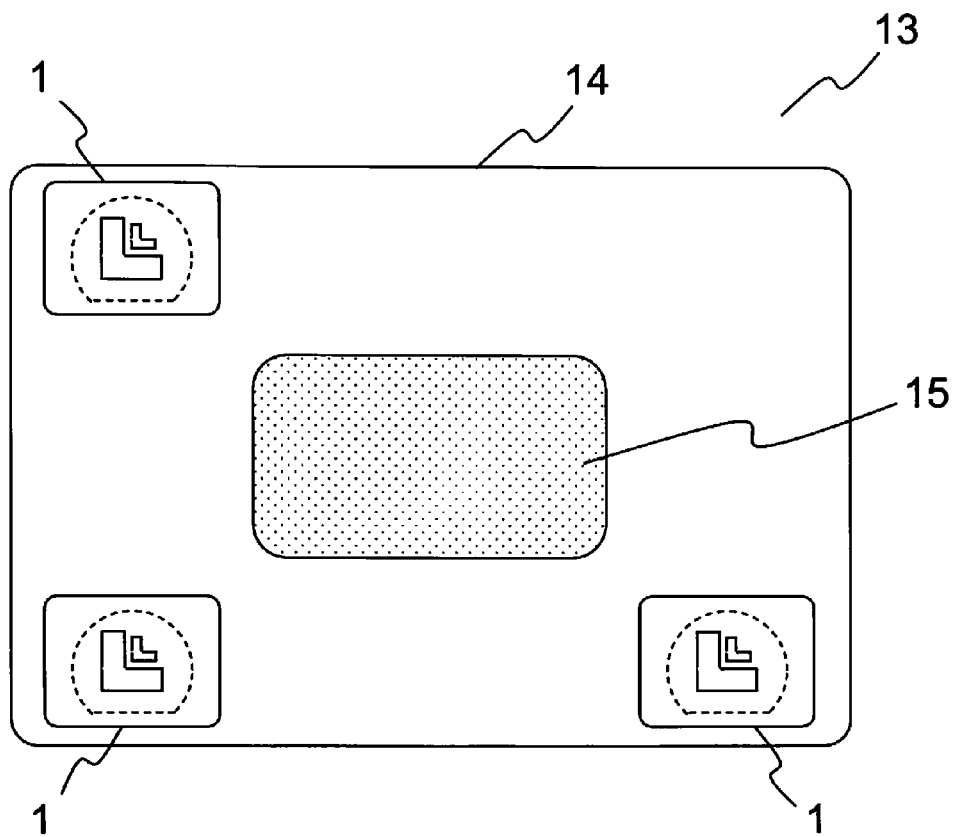
FIG. 6 depicts a first embodiment of the object holder system according to the invention.
Figure 7:
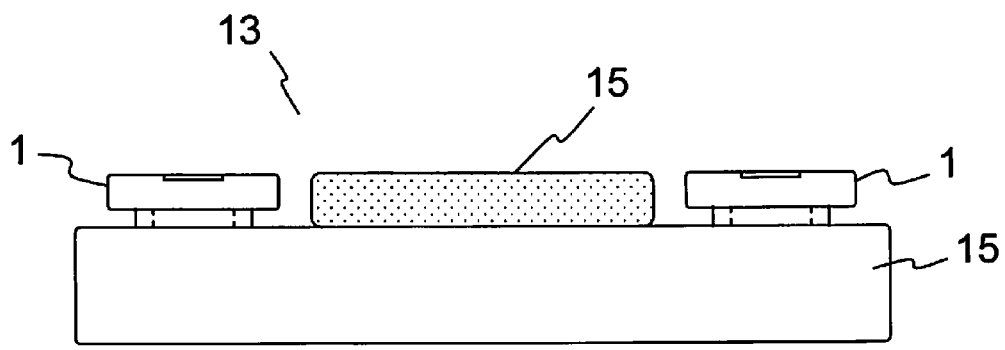
FIG. 7 depicts the side view of the embodiment of the object holder system in FIG. 6.

FIGS. 6 and 7 depict a top view of a first embodiment of the object holder system 13 according to the invention. The two-piece system includes object holder 14 and three alignment marker units 1. The object holder has a central object-receiving element; an object 15 to be examined is shown schematically. By their carrier axle, the alignment marker units 1 are mounted azimuth-correctly on three outer corners of the object holder using a clamp connection and define a coordinate system which, in an operational state, i.e., the state of the alignment marker unit mounted on the object holder, allows for an easy microscope-supported calibration of the object or an area of the object relative to its position to the object holder and the position of the object holder relative to the microscope. It is clear from the side view in FIG. 7 that the individual alignment marker units are easily height-adjustable relative to the object holder. Thus the alignment marker units are very easily height-adjusted relative to the object to be examined.

Figure 8:
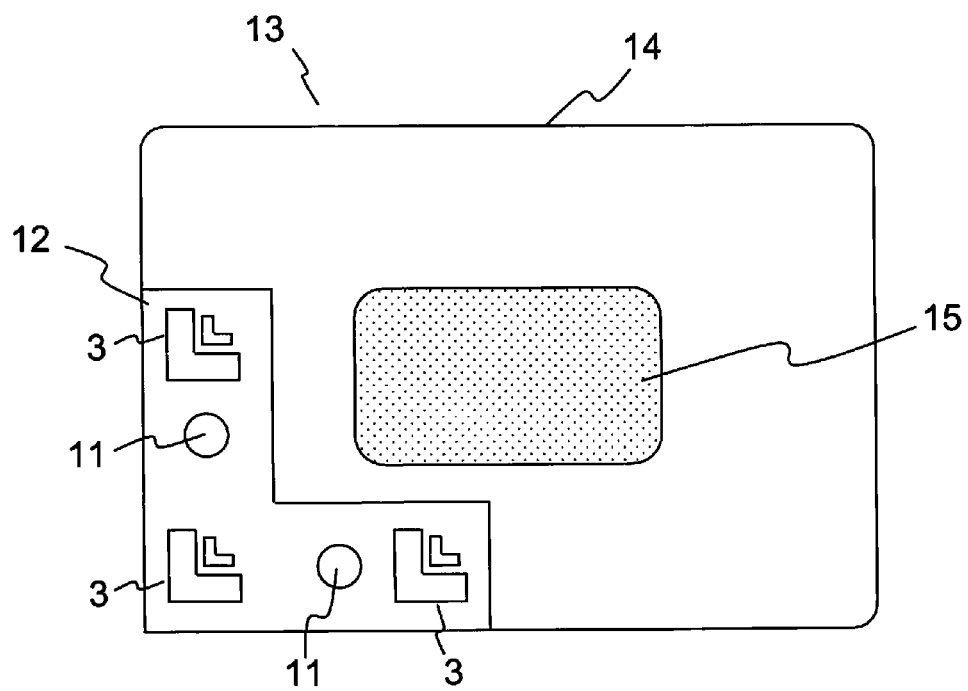
FIG. 8 depicts the top view of a second embodiment of the object holder system according to the invention.

FIG. 8 shows an alternative embodiment of the object holder system 13 according to the invention with an alignment marker unit 12 mounted to a correspondingly designed object holder.

LIST OF REFERENCE NUMERALS

1 Alignment marker unit
2 Headpiece
3 Alignment marker
4 Smaller partial marker
5 Larger partial marker
6 Carrier axle
7 Partial surface
8 Female thread
9 Extension part
10 Alignment marker unit
11 Bore
12 Alignment marker unit
13 Object holder system
14 Object holder
15 Object

The invention claimed is:

1. An alignment marker unit for an object holder for microscopic imaging of an object, wherein
the alignment marker unit can be removed from and remounted on the object holder and wherein the object holder supports the object and the object is removable and remountable on the object holder and wherein the object supports a sample to be microscopically imaged,
wherein the alignment marker unit comprises at least one alignment marker structured for microscope-supported detection, and
wherein the alignment marker is located and structured to determine a position and/or orientation of the object or an area of the object relative to the object holder.

2. The alignment marker unit according to claim 1, wherein the alignment marker unit comprises first contact surfaces, which precisely fit corresponding second contact surfaces of the object holder.

3. The alignment marker unit according to claim 2, wherein the first contact surfaces of the alignment marker unit are formed such that the alignment marker unit can be remounted azimuth-correctly on the object holder.

4. The alignment marker unit according to claim 1, wherein the alignment marker unit has a two-piece design comprising at least one first contact element and a headpiece, and wherein the alignment marker is included in the headpiece.

5. The alignment marker unit according to claim 4, wherein an outer surface of the first contact element comprises at least two differently designed partial surfaces.

6. The alignment marker unit according claim 4, further comprising an additional contact element wherein the first contact element of the alignment marker unit can be extended by coupling the additional contact element to the first contact element.

7. The alignment marker unit according to claim 1, wherein the alignment marker is L-shaped.

8. The alignment marker unit according to claim 1, wherein the alignment marker comprises a double structure, and wherein units of the double structure are adapted to two different microscopy zoom levels.

9. The alignment marker unit according to claim 1, wherein the alignment marker unit comprises at least three alignment markers.

10. The alignment marker unit according to claim 1, wherein all elements of the alignment marker unit are electrically conducting and connected with one another in an electrically conducting manner.

11. An object holder system for microscopic imaging of an object, wherein the object holder system has at least a two-piece design comprising an object holder and at least one removable and remountable alignment marker unit according to claim 2.

12. The object holder system according to claim 11, wherein the first contact surfaces of the alignment marker unit have a clearance fit of less than 50 μm with the second contact surfaces of the object holder.

13. The object holder system according to claim 11, further comprising a clamp connection or a screw connection whereby alignment marker unit is remounted on the object holder or wherein the alignment marker unit is remounted on the object holder by clamping.

14. The object holder system according to claim 11, wherein the object holder and the alignment marker unit are height adjustable relative to one another.

15. The object holder system according to claim 11, wherein the object holder system comprises at least three alignment marker units, which are independently remountable at a correct distance and a correct azimuth.

16. The object holder system according to claim 11, wherein the object holder and the alignment marker unit are connected with one another in an electrically conducting manner when remounted.

* * * * *